US011199263B2

(12) United States Patent
Amador et al.

(10) Patent No.: US 11,199,263 B2
(45) Date of Patent: Dec. 14, 2021

(54) TWO-PIECE SEAT FOR CONTACTING SEAL

(71) Applicant: United Technologies Corporation, Farmington, CT (US)

(72) Inventors: Armando Amador, Wethersfield, CT (US); Ernest Boratgis, South Windsor, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 272 days.

(21) Appl. No.: 16/361,689

(22) Filed: Mar. 22, 2019

(65) Prior Publication Data

US 2020/0300365 A1    Sep. 24, 2020

(51) Int. Cl.
*F16J 15/3276* (2016.01)
*F01D 11/00* (2006.01)
*F16J 15/24* (2006.01)
*F16J 15/34* (2006.01)

(52) U.S. Cl.
CPC ......... *F16J 15/3276* (2013.01); *F01D 11/005* (2013.01); *F16J 15/24* (2013.01); *F16J 15/3404* (2013.01); *F05D 2220/32* (2013.01); *F05D 2240/55* (2013.01)

(58) Field of Classification Search
CPC ...... F16J 15/3276; F16J 15/24; F16J 15/3404; F01D 11/005; F05D 2220/32; F05D 2240/55

See application file for complete search history.

(56) References Cited

U.S. PATENT DOCUMENTS

| 2,990,202 A * | 6/1961 | Dennison | F01D 11/003 277/399 |
| 5,639,096 A * | 6/1997 | Ullah | F16J 15/3404 277/401 |
| 10,174,629 B1 * | 1/2019 | Valva | F16C 33/667 |
| 10,767,510 B2 * | 9/2020 | Amador | F01D 25/183 |
| 2008/0217862 A1 | 9/2008 | Feigl et al. | |

(Continued)

FOREIGN PATENT DOCUMENTS

WO    2018005291 A1    1/2018

OTHER PUBLICATIONS

European Search Report for European Application No. 20161641.4, dated Aug. 14, 2020, 8 pages.

*Primary Examiner* — Eugene G Byrd
(74) *Attorney, Agent, or Firm* — Cantor Colburn LLP

(57) ABSTRACT

A contacting seal for a gas turbine engine include a seal element rotationally fixed relative to an axis of rotation, and a seal seat configured to rotate circumferentially about an axis of rotation and contact the seal element at an interface surface of the seal seat. The seal seat includes an interface component including a seat wall including the interface surface and a seat cavity surface opposite the interface surface, such that a wall thickness of the interface component is defined therebetween. A cover component is secured to the interface component, the cover component including a cover cavity surface. The seat cavity surface and the cover cavity surface define a cooling cavity therebetween configured such that a flow of fluid therethrough cools the interface component via contact between the coolant and the seat cavity surface.

18 Claims, 6 Drawing Sheets

(56) References Cited

U.S. PATENT DOCUMENTS

| | | | |
|---|---|---|---|
| 2008/0310953 A1* | 12/2008 | Garrison | F16J 15/342 |
| | | | 415/173.2 |
| 2014/0178178 A1* | 6/2014 | Besson | F16J 15/3452 |
| | | | 415/113 |
| 2015/0275761 A1 | 10/2015 | Duffy et al. | |
| 2016/0010477 A1* | 1/2016 | Maret | F01D 25/12 |
| | | | 277/408 |
| 2016/0186589 A1* | 6/2016 | Budnick | F01D 11/005 |
| | | | 415/219.1 |
| 2016/0238137 A1* | 8/2016 | Clark | F16C 37/00 |
| 2016/0265375 A1* | 9/2016 | Maret | F16J 15/3472 |
| 2016/0348792 A1 | 12/2016 | Labbe | |
| 2018/0045316 A1* | 2/2018 | Kovacik | F16J 15/324 |

\* cited by examiner

TWO-PIECE SEAT FOR CONTACTING SEAL

BACKGROUND

Exemplary embodiments of the present disclosure pertain to the art of contacting rotating seals for, for example, bearing compartments of gas turbine engines.

Bearing compartments require seals to contain the oil within the bearing compartment, which serves to lubricant the bearings contained therein. A typical seal arrangement utilizes a rotating seal seat and a rotationally stationary seal element urged into axial contact with the seal seat. The seal element is typically a carbon seal. Coil springs, wave springs, or bellows are typically utilized to urge the seal element into contact with the seal seat. Heat generation due to frictional contact between the seal element and the seal seat is alleviated by a flow of oil through passages in the seal seat, to which heat is transferred from the seal seat and then dissipated from the flow of oil.

To provide the flow of oil, a number is discrete oil passages are provided in the seal seat. The use of discrete passages limits the amount of heat which can be dissipated by the oil to areas near the passages. Further, with increasing rotational speeds of the engine, the resident time of oil in the passages is reduced and heat pick-up is limited. Also, the passages are typically oriented such that a distance between the passage and the interface is not uniform, resulting in an undesirable temperature gradient across the seal interface.

BRIEF DESCRIPTION

In one embodiment, a contacting seal for a gas turbine engine include a seal element rotationally fixed relative to an axis of rotation, and a seal seat configured to rotate circumferentially about an axis of rotation and contact the seal element at an interface surface of the seal seat. The seal seat includes an interface component including a seat wall including the interface surface and a seat cavity surface opposite the interface surface, such that a wall thickness of the interface component is defined therebetween. A cover component is secured to the interface component, the cover component including a cover cavity surface. The seat cavity surface and the cover cavity surface define a cooling cavity therebetween configured such that a flow of fluid therethrough cools the interface component via contact between the coolant and the seat cavity surface.

Additionally or alternatively, in this or other embodiments the interface component is secured to the cover component via a press fit.

Additionally or alternatively, in this or other embodiments a plurality of oil feed ports are at least partially defined by the cover component and fluidly connected to the cooling cavity to direct the flow of fluid toward the cooling cavity. A plurality of oil outlet ports are at least partially defined in the cover component and fluidly connected to the cooling cavity to direct the flow of fluid from the cooling cavity.

Additionally or alternatively, in this or other embodiments the plurality of oil feed ports are radially inboard of the interface surface relative to the axis of rotation.

Additionally or alternatively, in this or other embodiments one or more flow trips extend into the cooling cavity between the plurality of oil feed ports and the interface surface to direct the flow of fluid toward the seat cavity surface.

Additionally or alternatively, in this or other embodiments one or more dams extend into the cooling cavity between the interface surface and the plurality of oil outlet ports to slow the exit of the flow of fluid from the cooling cavity.

Additionally or alternatively, in this or other embodiments the oil outlet ports are located radially outboard of the interface surface.

Additionally or alternatively, in this or other embodiments the oil feed ports are configured to direct the flow of fluid into the cooling cavity in one of an axial direction toward the interface surface or a radially outwardly direction relative to the axis of rotation.

Additionally or alternatively, in this or other embodiments the cooling cavity is circumferentially continuous about the axis of rotation.

Additionally or alternatively, in this or other embodiments the interface component is formed from a first material and the cover component is formed from a second material different from the first material.

In another embodiment, a gas turbine engine includes a rotating shaft, one or more bearing arrangements supportive of the rotating shaft and a contacting seal configured to seal a bearing arrangement of the one or more bearing arrangements. The contacting seal includes a seal element rotationally fixed relative to an axis of rotation and a seal seat configured to rotate circumferentially about an axis of rotation and contact the seal element at an interface surface of the seal seat. The seal seat includes an interface component including a seat wall including the interface surface and a seat cavity surface opposite the interface surface, such that a wall thickness of the interface component is defined therebetween. A cover component is secured to the interface component, the cover component including a cover cavity surface. The seat cavity surface and the cover cavity surface define a cooling cavity therebetween configured such that a flow of fluid therethrough cools the interface component via contact between the coolant and the seat cavity surface.

Additionally or alternatively, in this or other embodiments the interface component is secured to the cover component via a press fit.

Additionally or alternatively, in this or other embodiments a plurality of oil feed ports are at least partially defined by the cover component and fluidly connected to the cooling cavity to direct the flow of fluid toward the cooling cavity. A plurality of oil outlet ports are at least partially defined in the cover component and fluidly connected to the cooling cavity to direct the flow of fluid from the cooling cavity.

Additionally or alternatively, in this or other embodiments the plurality of oil feed ports are radially inboard of the interface surface relative to the axis of rotation.

Additionally or alternatively, in this or other embodiments one or more flow trips extend into the cooling cavity between the plurality of oil feed ports and the interface surface to direct the flow of fluid toward the seat cavity surface.

Additionally or alternatively, in this or other embodiments one or more dams extend into the cooling cavity between the interface surface and the plurality of oil outlet ports to slow the exit of the flow of fluid from the cooling cavity.

Additionally or alternatively, in this or other embodiments the oil outlet ports are located radially outboard of the interface surface.

Additionally or alternatively, in this or other embodiments the oil feed ports are configured to direct the flow of fluid into the cooling cavity in one of an axial direction toward the interface surface or a radially outwardly direction relative to the axis of rotation.

Additionally or alternatively, in this or other embodiments the cooling cavity is circumferentially continuous about the axis of rotation.

Additionally or alternatively, in this or other embodiments the interface component is formed from a first material and the cover component is formed from a second material different from the first material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
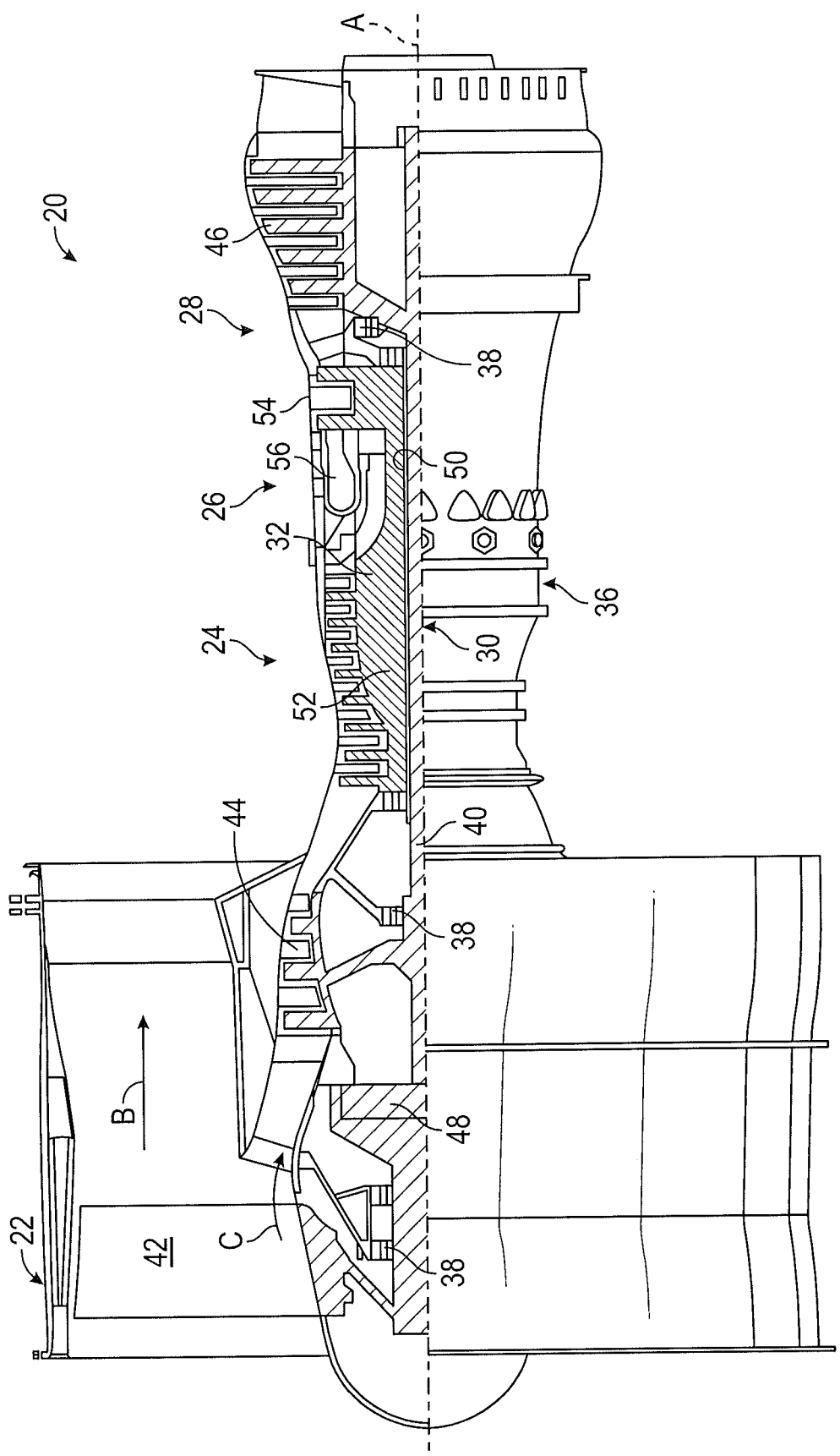
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

Figure 2:
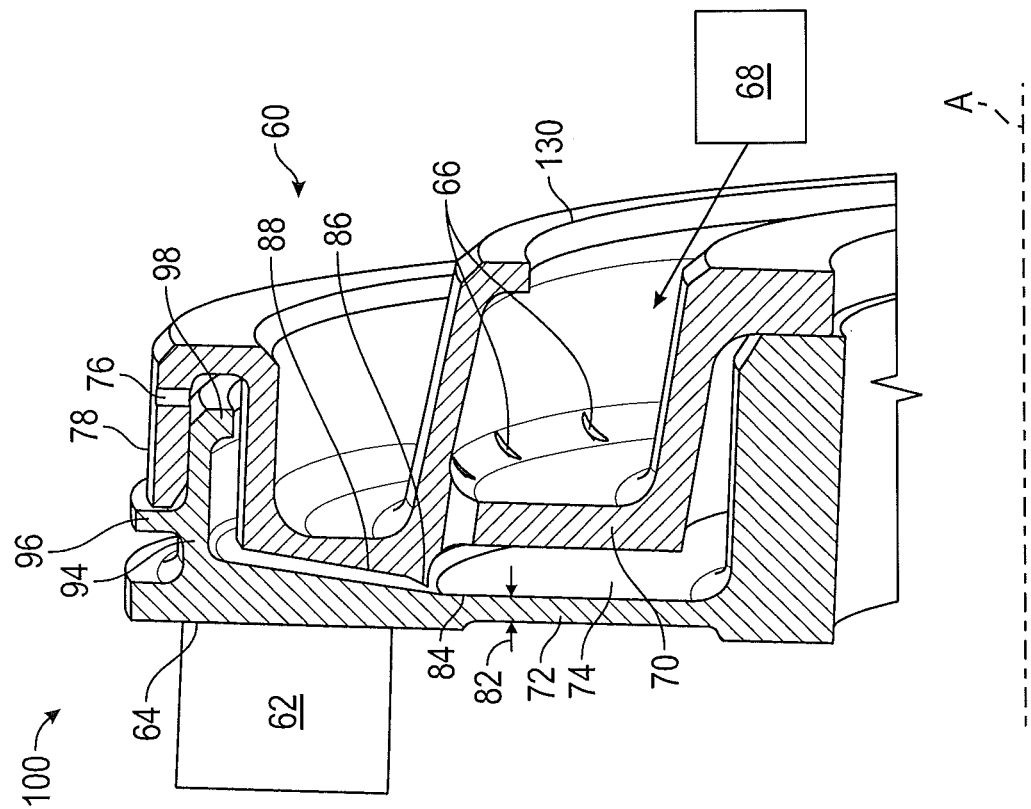
FIG. 2 is a partial cross-sectional view of an embodiment of a seal arrangement.

Referring now to FIG. 2, the bearing systems 38 are sealed to maintain a supply of lubrication and cooling oil within the bearing systems 38, also referred to herein as a bearing compartment. A seal arrangement 100 at the bearing system 38 includes a seal seat 60 and a seal element 62 in contact with the seal seat 60 at an interface surface 64. The seal seat 60 is operably connected to and rotates with a rotating component of the gas turbine engine 10, for example, the inner shaft 40 or the outer shaft 50. The seal element 62 is formed from, for example, carbon. In some embodiments, the interface surface 64 includes a wear prevention coating applied thereto.

The seal seat 60 includes a plurality of oil feed ports 66 directing an oil flow therethrough from an oil source, for example, a main oil pump shown schematically at 68. The oil feed ports 66 are located in for example a back wall 70 of the seal seat 60 located opposite a front wall 72, the front wall 72 including the interface surface 64. The back wall 70 is configured to encourage oil migration toward and through the oil feed ports 66 into a cooling cavity 74. The cooling cavity 74 is defined between the back wall 70 and the front wall 72. The cooling cavity 74 extends radially to a plurality of oil outlet ports 76 formed, for example, through a radially outer wall 78 of the seal seat 60. The oil outlet ports 76 are sized and arranged to lengthen residence time of the oil flow in the cooling cavity 74. The cooling cavity 74 is configured such that the oil flow enters the cooling cavity 74 through the plurality of oil feed ports 66 and is urged radially outwardly along cooling cavity 74 due to rotation of the seal seat 60 about the engine central longitudinal axis A. The oil flow through the cooling cavity 74 absorbs thermal energy from the seal seat 60, thermal energy generated due to friction at the interface surface 64 between the seal seat 60 and the seal element 62. By the oil flow absorbing thermal energy, the seal seat 60 is cooled. The oil flow provides cooling to the interface surface 64 via thermal energy exchange with the front wall 72 while flowing along the cooling cavity 74. The oil flow exits the cooling cavity 74 through the plurality of oil outlet ports 76. The oil feed ports 66 are located radially inboard of the interface surface 64 so that the oil flow flows past the interface surface 64 when flowing along the cooling cavity 74. An oil dam 130 may extend from the back wall 70 from a location radially outboard of the oil feed ports 66 to capture the oil flow and direct the oil flow toward the oil feed ports 66. The oil dam 130 may be sloped radially inwardly with increasing axial distance from the back wall 70 to further direct the oil flow toward the oil feed ports 66.

The front wall 72 has a front wall thickness 82 defined by the interface surface 64 and a front cavity surface 84 of the cooling cavity 74. In some embodiments, the front wall thickness 82 is substantially constant to reduce thermal gradients at the interface surface 64. The front cavity surface 84 is tapered relative to the interface surface 64, in some embodiments. This taper encourages cooling oil to maintain contact with the front cavity surface 84 to improve cooling performance between the interface surface 64 and the seal element 62. Further, in some embodiments the cooling cavity 74 includes a protrusion 86 extending inwardly into the cooling cavity 74 from a back cavity surface 88 opposite the front cavity surface 84. The protrusion 86 is located radially outboard of the oil feed ports 66 and directs the oil flow toward the front cavity surface 84 radially inboard of the interface surface 64 to improve cooling of the seal seat 60 at the interface surface 64.

Figure 3:
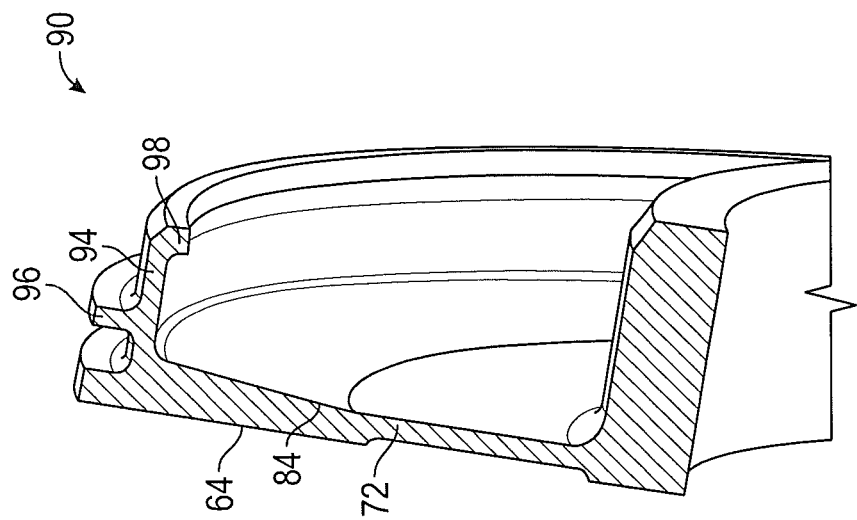
FIG. 3 is a partial cross-sectional view of an embodiment of an interface component of a seal seat of a seal arrangement.
Figure 4:
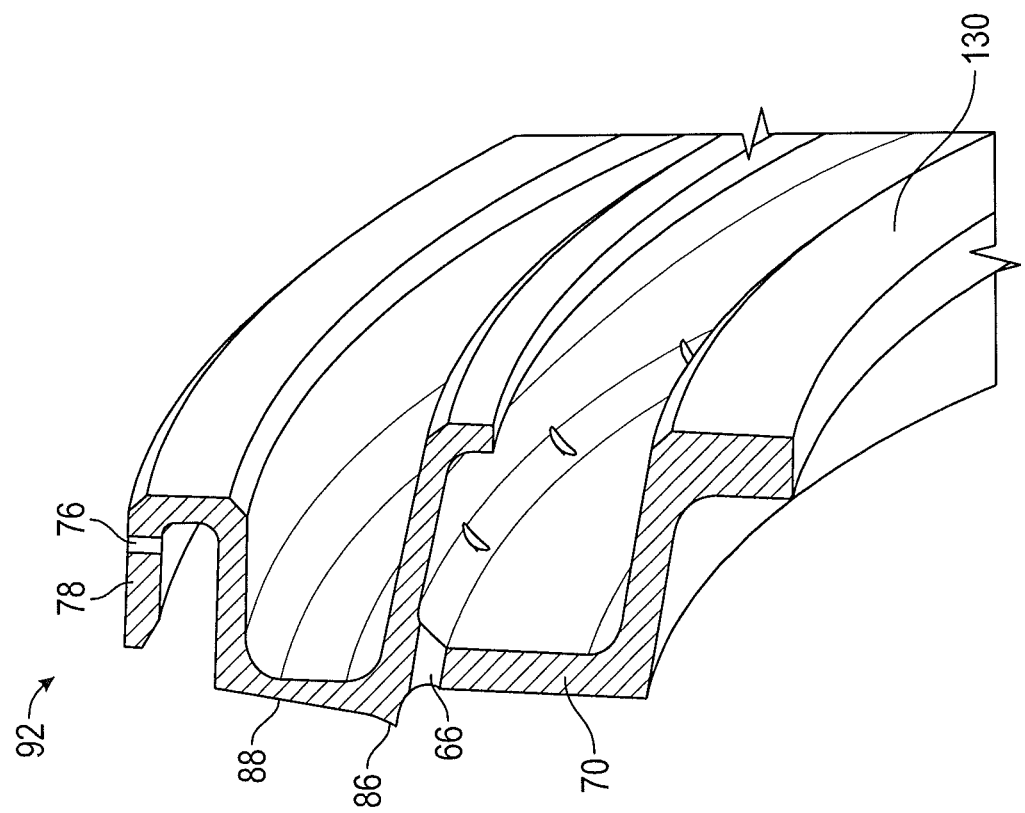
FIG. 4 is a partial cross-sectional view of an embodiment of a back component of a seal seat.

In some embodiments, such as shown in FIGS. 3 and 4, the seal seat 60 is a two-piece assembly with an interface component 90 including at least the front wall 72 including the interface surface 64. A back component 92 is secured to the interface component 90 and includes the back wall 70 such that the cooling cavity 74 is defined between the interface component 90 and the back component 92. In the embodiment, the back component 92 further includes the oil feed ports 66 and the oil outlet ports 76.

The interface component 90 includes an outer radial flange 94 such that to assemble the back component 92 to the interface component 90, the radially outer wall 78 of the back component 92 is press fit over the outer radial flange 94 (as shown in FIG. 2). The outer radial flange 94 may include a back-stop 96 to prevent over-seating of the radially outer wall 78 on the outer radial flange 94. The outer radial flange 94 may further include a radially-inwardly extending shoulder 98 extending into the cooling cavity 74 to slow the oil flow through the cooling cavity 74. While press fit is discussed herein to secure the interface component 90 to the back component 92, the components may be secured by other means, such as brazing. Further, in some embodiments, the seal seat 60 having interface component 90 and back component 92 may be formed as a single unitary component utilizing, for example, additive manufacturing. In some embodiments, the interface component 90 and the back component 92 are formed from the same material, while in other embodiments the materials may be different.

Figure 5:
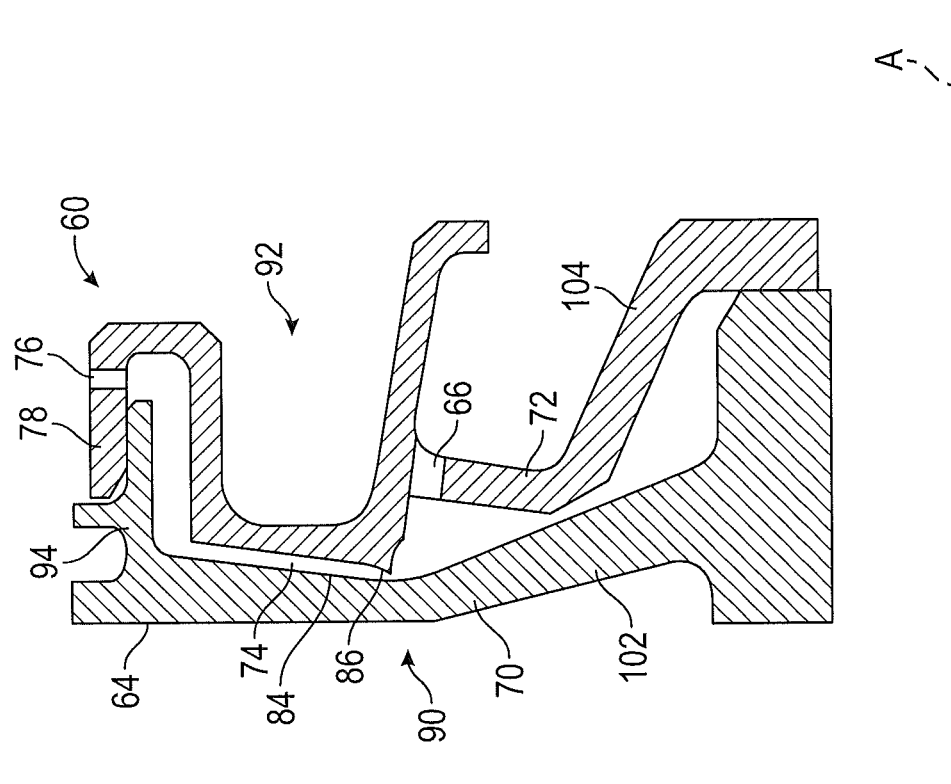
FIG. 5 illustrates an embodiment of a seal seat with an interface component having a conical base portion.

Referring now to FIG. 5, another embodiment of the seal arrangement 100 is illustrated. In the embodiment shown, the interface component 90 includes a conical base portion 102 of the front wall 72 increasingly sloping toward the interface surface 64 with increasing distance from the engine central longitudinal axis A. Such a configuration improves stiffness of the interface component 90 and reduces stack load influences on seal seat 60 flatness and waviness. Further, the back component 92 includes an angled back portion base 104 of the back wall 70 to more readily direct the oil flow toward the oil feed ports 66.

Figure 6:
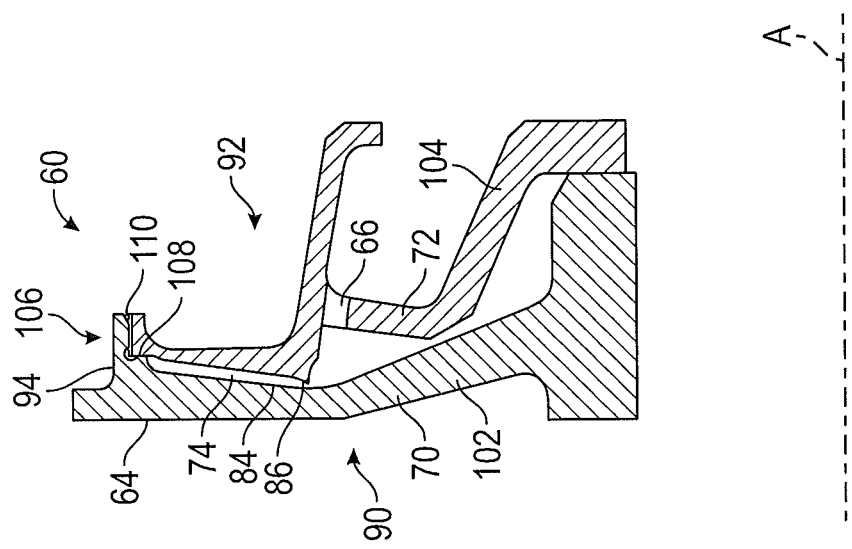
FIG. 6 illustrates an embodiment of a seal arrangement with oil outlet ports defined at an interface between the back component and the interface component.

In another embodiment, shown in FIG. 6, the oil outlet ports 76 are defined at an outer interface 106 between the back component 92 and the interface component 90. The oil outlet ports 76 are defined by a plurality of radially-extending slots 108 formed in the interface component 90 extending radially outwardly from the cooling cavity 74, and a plurality of axially extending slots 110 formed at a radially outboard end 112 of the back component 92. A portion of each radially-extending slot 108 is defined by each of the interface component 90 and the back component 92. Likewise, a portion of each axially-extending slot 110 is defined by each of the interface component 90 and the back component 92. The oil flow passes from the cooling cavity 74 through the radially-extending slots 108, and from the radially-extending slots 108 through the axially-extending slots 110 to exit the seal seat 60.

Figure 7:
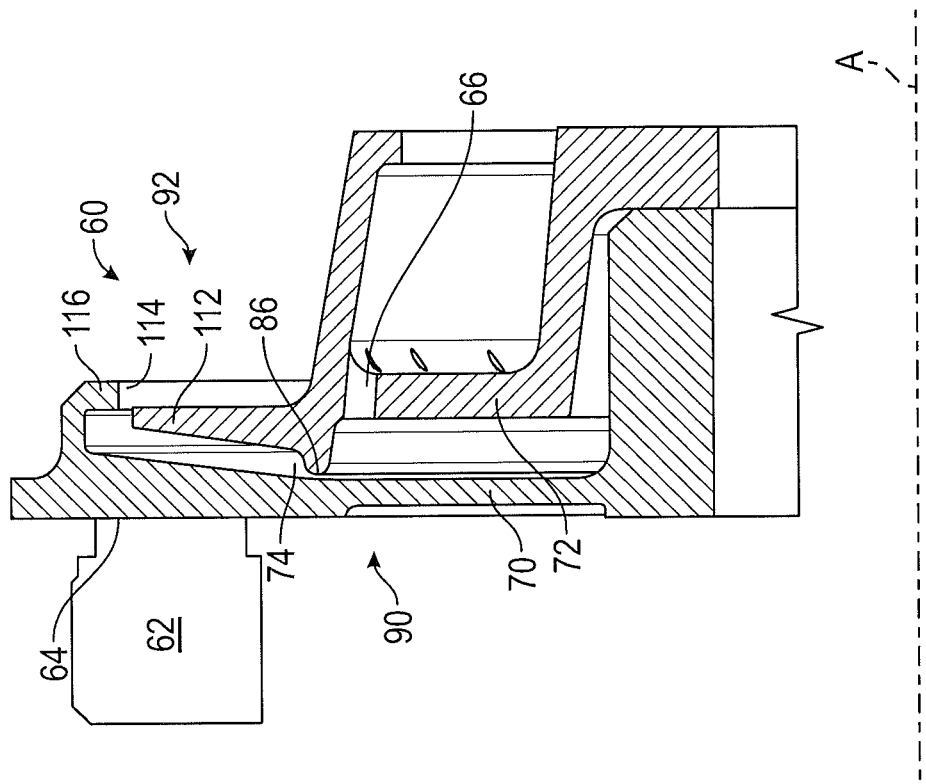
FIG. 7 illustrates another embodiment of a seal arrangement with oil outlet ports defined at an interface between the back component and the interface component.

Referring now to FIG. 7, in another embodiment, the oil outlet port 76 (also referring to FIG. 5) is an outlet gap 114 between an aft flange 116 of the interface component 90 and the radially outboard end 112 of the back component 92. In some embodiments, the outlet gap 114 is fully circumferential about the engine central longitudinal axis A, while in other embodiments the outlet gap 114 may be circumferentially segmented. Further, in some embodiments, such as shown the outlet gap 114 is a gap in the radial direction relative to the engine central longitudinal axis A, while in other embodiments, the outlet gap 114 may be, for example, an axial gap or a combination of axial and radial.

Figure 8:
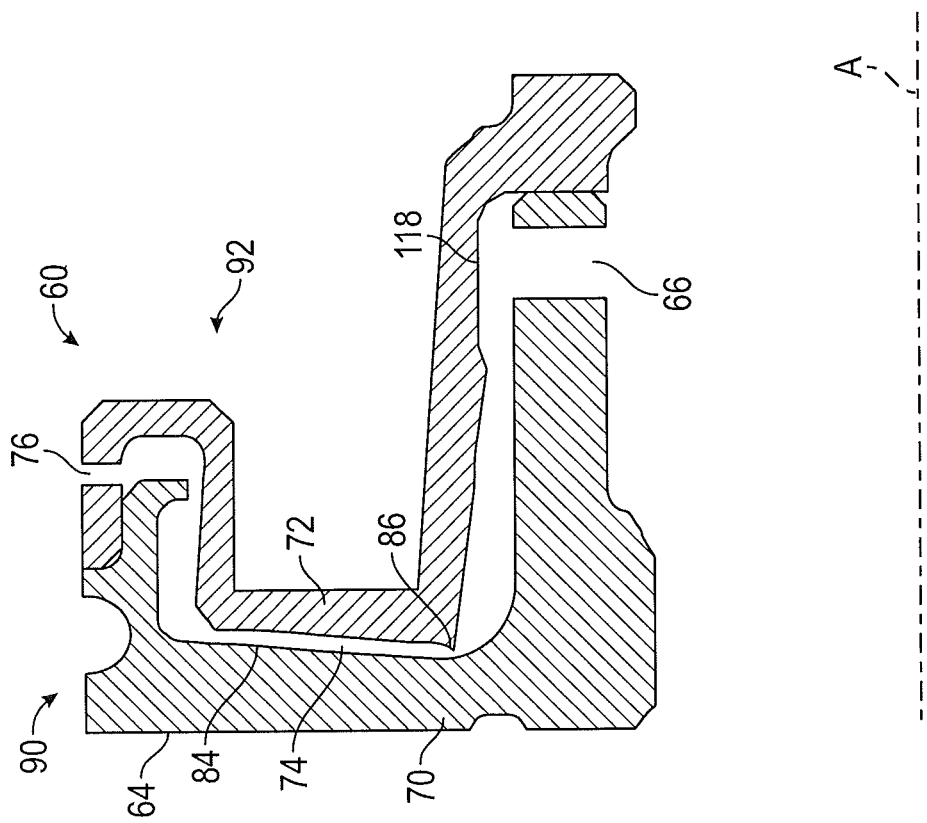
FIG. 8 illustrates an embodiment having oil feed ports which direct the oil flow therethrough in a radial direction.

Another embodiment of seal arrangement 60 is illustrated in FIG. 8. In this embodiment, the oil flow is directed through the plurality of oil feed ports 66 in a radial direction, relative to the engine central longitudinal axis A. Further, the back component 92 includes an oil pool 118, configured as a recess in the back component radially outboard of the plurality of oil feed ports 66, between the oil feed ports 66 and the cooling cavity 74. After flowing through the plurality of oil feed ports 66, at least a portion of the oil flow collects in the oil pool 118, and may be distributed circumferentially, thus improving oil distribution uniformity in the circumferential direction, relative to engine longitudinal axis A.

Figure 9:
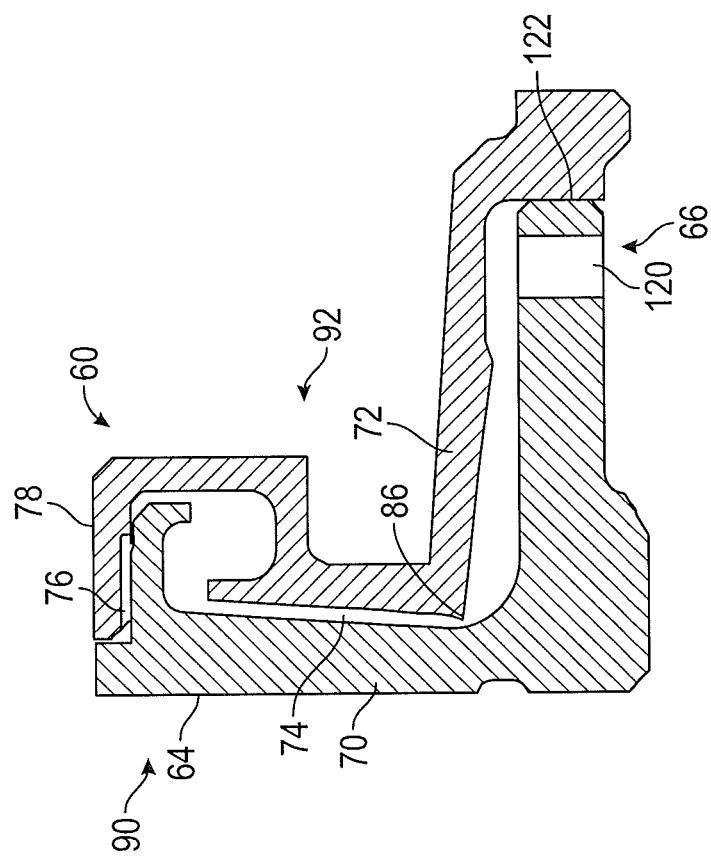
FIG. 9 illustrates another embodiment having oil feed ports which direct the oil flow therethrough in a radial direction.
Figure 10:
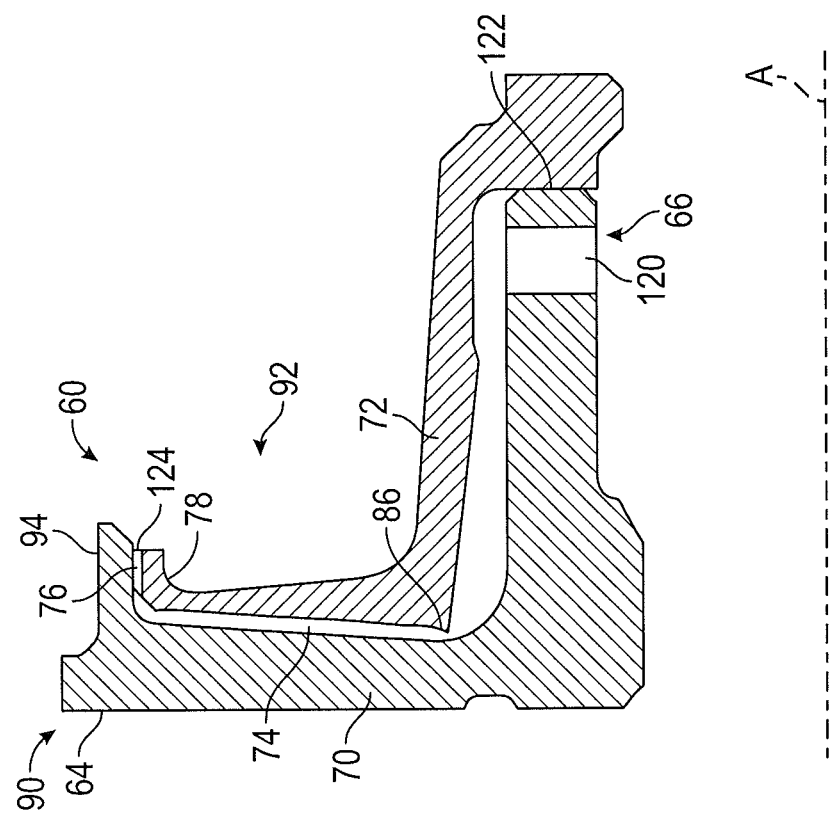
FIG. 10 illustrates another embodiment of a seal arrangement with oil outlet ports defined at an interface between the back component and the interface component.

In the embodiment of FIG. 9, the oil feed ports 66 which direct the oil flow therethrough in the radial direction are defined by a plurality of inlet notches 120 in the interface part 90 and in inlet face 122 of the back portion axially adjacent the inlet notches 120. The embodiment of FIG. 10 also includes the oil feed ports 66 configured such that the oil flow is directed through the plurality of oil feed ports 66 in a radial direction, relative to the engine central longitudinal axis A. Further, the plurality of oil outlet ports 76 in the embodiment are configured as slots 124 defined between the radially outer wall 78 of the back component 92 and the outer radial flange 94 of the interface component 90, with the outer radial flange 94 located radially outboard of the radially outer wall 78.

Figure 11:
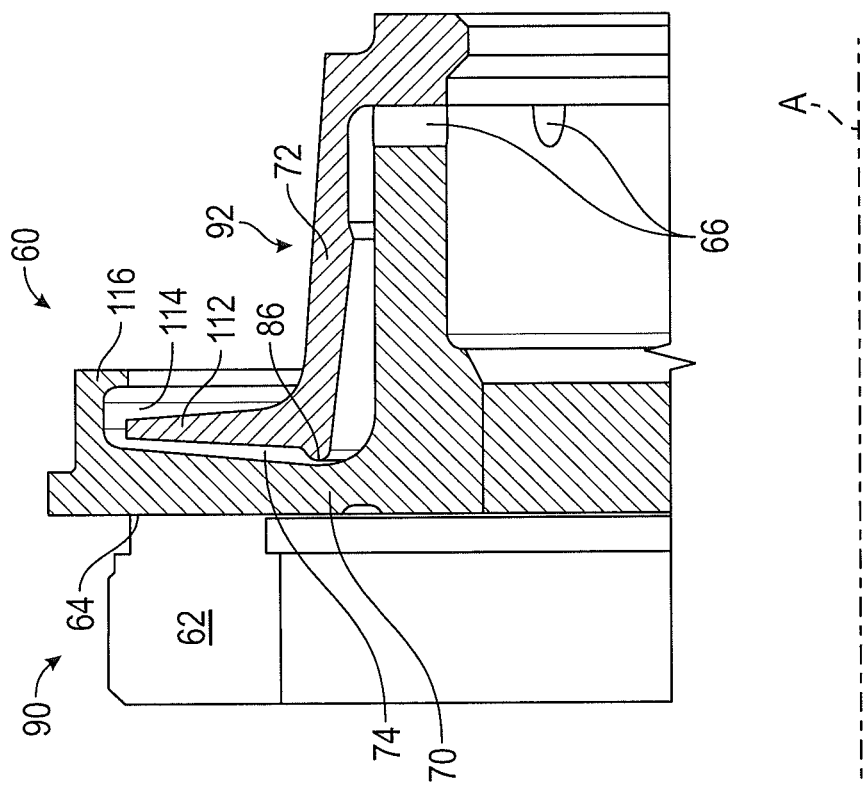
FIG. 11 illustrates still another embodiment of a seal arrangement with oil outlet ports defined at an interface between the back component and the interface component.

Another embodiment is illustrated in FIG. 11. In that embodiment, the oil feed ports 66 configured such that the oil flow is directed through the plurality of oil feed ports 66 in a radial direction, relative to the engine central longitudinal axis A. Further, the oil outlet port 76 is an outlet gap 114 between an aft flange 116 of the interface component 90 and the radially outboard end 112 of the back component 92. In some embodiments, the outlet gap 114 is fully circumferential about the engine central longitudinal axis A, while in other embodiments the outlet gap 114 may be circumferentially segmented. Further, in some embodiments, such as shown the outlet gap 114 is a gap in the radial direction relative to the engine central longitudinal axis A, while in other embodiments, the outlet gap 114 may be, for example, an axial gap or a combination of axial and radial.

The sealing arrangement disclosed herein, in particular the seal seat 60 configurations, provide a compact solution that works with existing oil lubrication nozzles and the like. The seal seat 60 and the cooling cavity 74 are configured to encourage the oil flow to increase contact with the interface component 90 in the cooling cavity 74 thus improving thermal energy transfer between the interface component 90 and the oil flow. Further, the cooling cavity 74 and the oil outlet ports 76 are configured to increase the volume of oil retained in the cooling cavity 74 and to increase the residence time of the oil flow in the cooling cavity 74, thus improving thermal energy removal from the interface component 90.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A contacting seal for a gas turbine engine, comprising:
    a seal element rotationally fixed relative to an axis of rotation;
    a seal seat configured to rotate circumferentially about an axis of rotation and contact the seal element at an interface surface of the seal seat, the seal seat including:
        an interface component including:
            a seat wall including the interface surface;
            a seat cavity surface opposite the interface surface, such that a wall thickness of the interface component is defined therebetween;
        a cover component secured to the interface component, the cover component including a cover cavity surface, the seat cavity surface and the cover cavity surface defining a cooling cavity therebetween configured such that a flow of fluid therethrough cools the interface component via contact between the flow of fluid and the seat cavity surface;
        a plurality of oil feed ports at least partially defined by the cover component and fluidly connected to the cooling cavity to direct the flow of fluid toward the cooling cavity; and
        a plurality of oil outlet ports at least partially defined in the cover component and fluidly connected to the cooling cavity to direct the flow of fluid from the cooling cavity.

2. The contacting seal of claim 1, wherein the interface component is secured to the cover component via a press fit.

3. The contacting seal of claim 1, wherein the plurality of oil feed ports are radially inboard of the interface surface relative to the axis of rotation.

4. The contacting seal of claim 1, further comprising one or more flow trips disposed extending into the cooling cavity between the plurality of oil feed ports and the interface surface to direct the flow of fluid toward the seat cavity surface.

5. The contacting seal of claim 1, further comprising one or more dams extending into the cooling cavity between the interface surface and the plurality of oil outlet ports to slow the exit of the flow of fluid from the cooling cavity.

6. The contacting seal of claim 1, wherein the oil outlet ports are located radially outboard of the interface surface.

7. The contacting seal of claim 1, wherein the oil feed ports are configured to direct the flow of fluid into the cooling cavity in one of an axial direction toward the interface surface or a radially outwardly direction relative to the axis of rotation.

8. The contacting seal of claim 1, wherein the cooling cavity is circumferentially continuous about the axis of rotation.

9. The contacting seal of claim 1, wherein the interface component is formed from a first material and the cover component is formed from a second material different from the first material.

10. A gas turbine engine, comprising:
a rotating shaft;
one or more bearing arrangements supportive of the rotating shaft; and
a contacting seal configured to seal a bearing arrangement of the one or more bearing arrangements, the contacting seal including:
a seal element rotationally fixed relative to an axis of rotation;
a seal seat configured to rotate circumferentially about an axis of rotation and contact the seal element at an interface surface of the seal seat, the seal seat including:
an interface component including:
a seat wall including the interface surface;
a seat cavity surface opposite the interface surface, such that a wall thickness of the interface component is defined therebetween;
a cover component secured to the interface component, the cover component including a cover cavity surface, the seat cavity surface and the cover cavity surface defining a cooling cavity therebetween configured such that a flow of fluid therethrough cools the interface component via contact between the flow of fluid and the seat cavity surface;
a plurality of oil feed ports at least partially defined by the cover component and fluidly connected to the cooling cavity to direct the flow of fluid toward the cooling cavity; and
a plurality of oil outlet ports at least partially defined in the cover component and fluidly connected to the cooling cavity to direct the flow of fluid from the cooling cavity.

11. The gas turbine engine of claim 10, wherein the interface component is secured to the cover component via a press fit.

12. The gas turbine engine of claim 10, wherein the plurality of oil feed ports are radially inboard of the interface surface relative to the axis of rotation.

13. The gas turbine engine of claim 10, further comprising one or more flow trips disposed extending into the cooling cavity between the plurality of oil feed ports and the interface surface to direct the flow of fluid toward the seat cavity surface.

14. The gas turbine engine of claim 10, further comprising one or more dams extending into the cooling cavity between the interface surface and the plurality of oil outlet ports to slow the exit of the flow of fluid from the cooling cavity.

15. The gas turbine engine of claim 10, wherein the oil outlet ports are located radially outboard of the interface surface.

16. The gas turbine engine of claim 10, wherein the oil feed ports are configured to direct the flow of fluid into the cooling cavity in one of an axial direction toward the interface surface or a radially outwardly direction relative to the axis of rotation.

17. The gas turbine engine of claim 10, wherein the cooling cavity is circumferentially continuous about the axis of rotation.

18. The gas turbine engine of claim 10, wherein the interface component is formed from a first material and the cover component is formed from a second material different from the first material.

* * * * *